(No Model.) 3 Sheets—Sheet 1.
J. F. R. KNOBLOCH.
TIDAL MOTOR.
No. 582,651. Patented May 18, 1897.
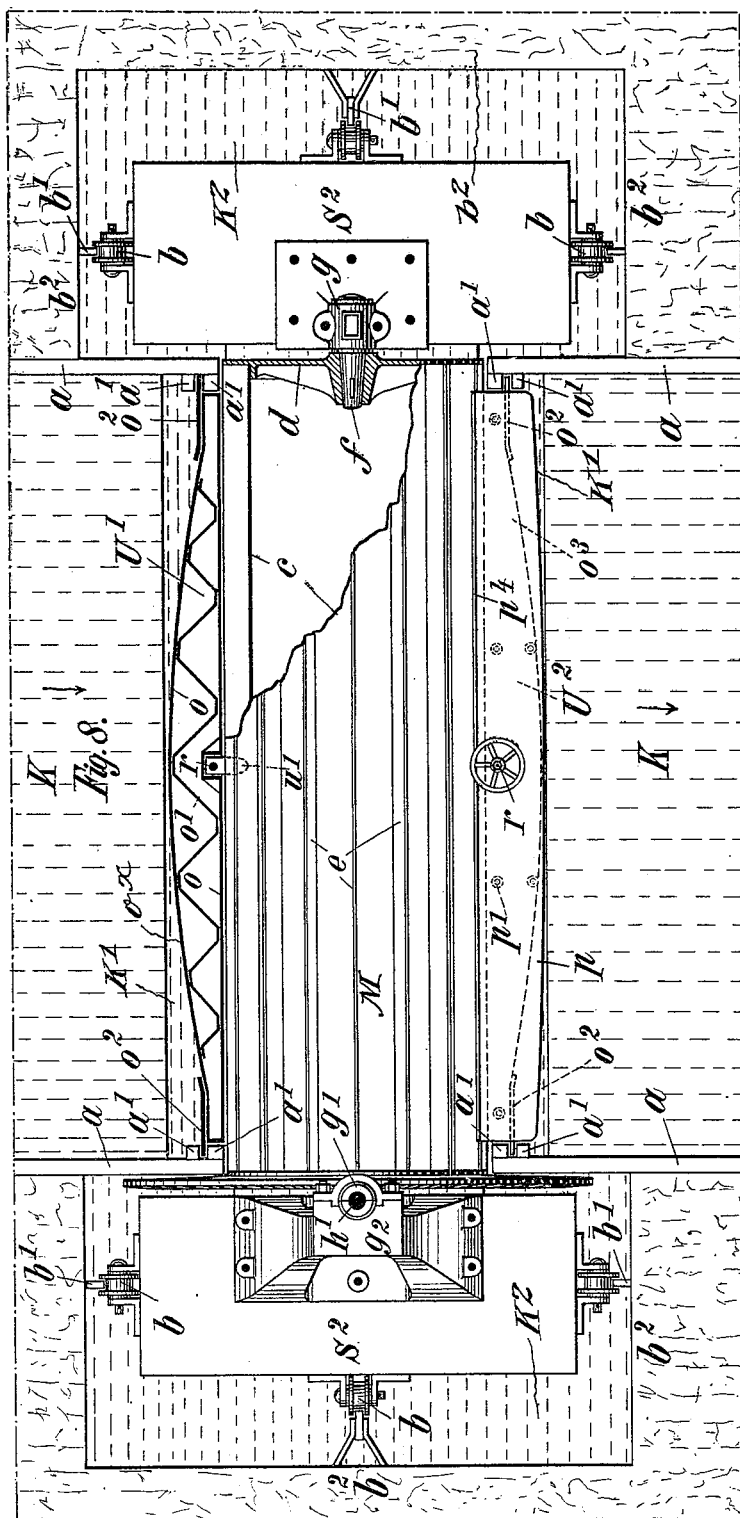
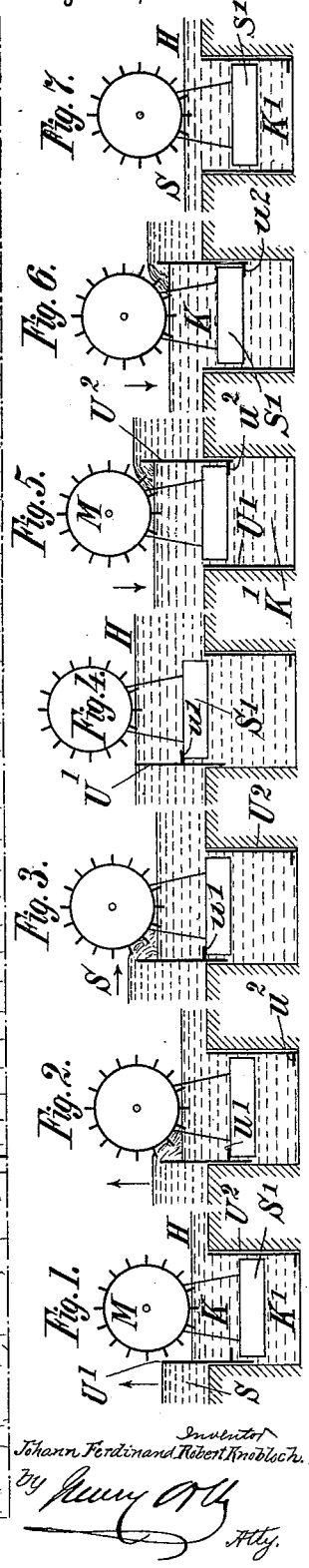
Inventor
Johann Ferdinand Robert Knobloch.

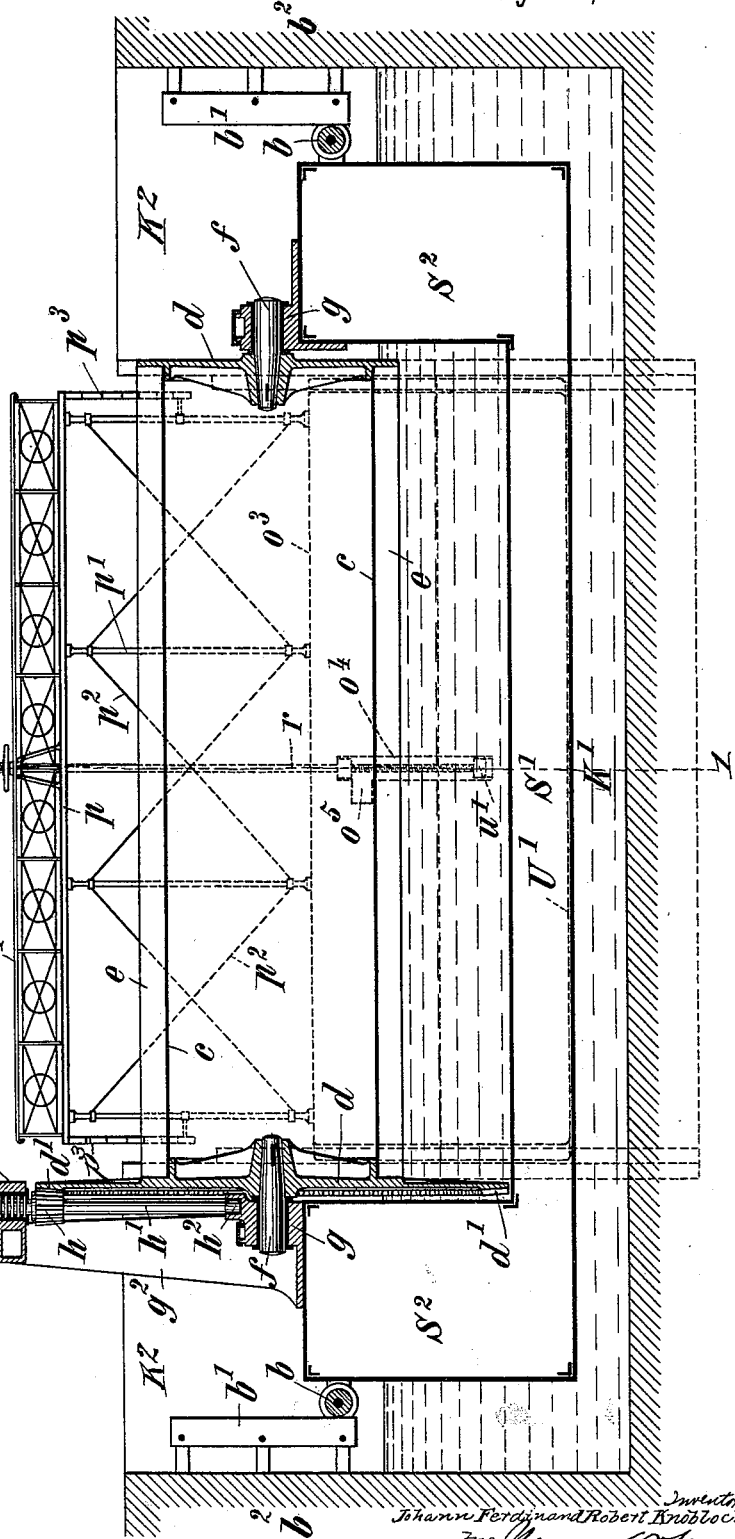
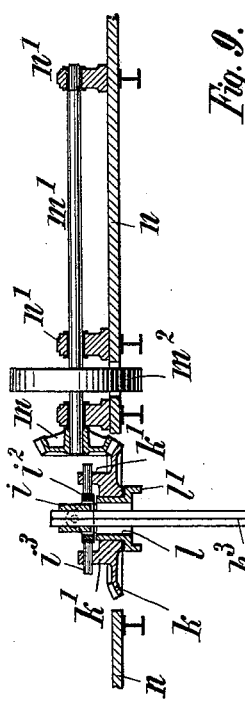

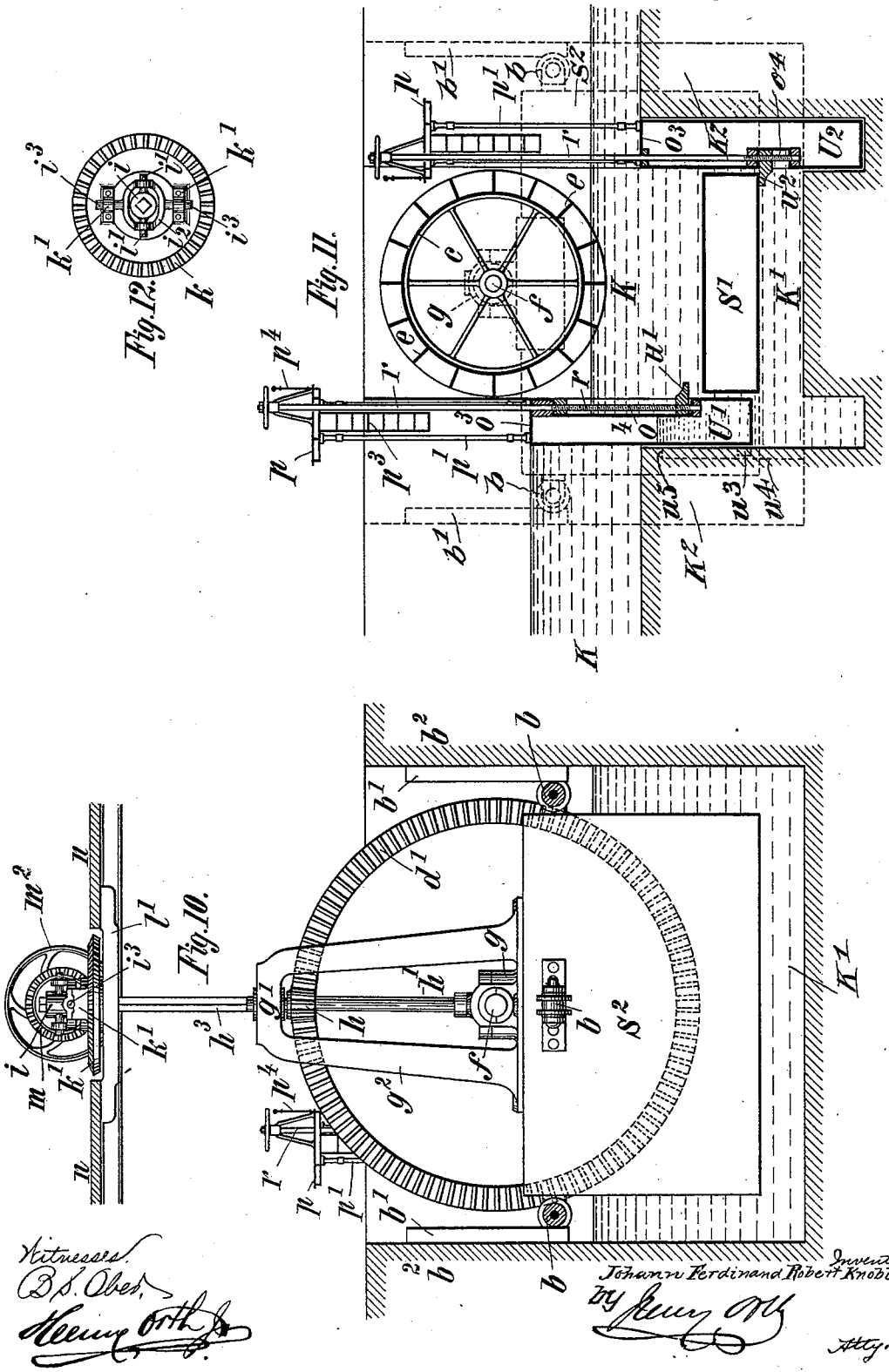

UNITED STATES PATENT OFFICE.

JOHANN FERDINAND ROBERT KNOBLOCH, OF HAMBURG, GERMANY.

TIDAL MOTOR.

SPECIFICATION forming part of Letters Patent No. 582,651, dated May 18, 1897.

Application filed October 1, 1895. Serial No. 564,303. (No model.)

*To all whom it may concern:*

Be it known that I, JOHANN FERDINAND ROBERT KNOBLOCH, a subject of the Emperor of Germany, residing at Hamburg-Eimsbüttel, in the Empire of Germany, have invented certain new and useful Improvements in Tidal Motors; and I do hereby declare the following to be a full, clear, and exact description of the invention, such as will enable others skilled in the art to which it appertains to make and use the same, reference being had to the accompanying drawings, and to letters of reference marked thereon, which form a part of this application.

My invention has relation to apparatus for utilizing the flow and ebb of the tide as a source of power for any desired purpose; and it has for its object the provision of means for controlling, regulating, and utilizing the flow and ebb of the tide, so that a practically constant power may be derived therefrom.

In my improved apparatus the flood-tide water is caused to flow over an overfall or sluice-gate into a race in which is arranged a water-driven wheel—as, for instance, a turbine—or a wheel revoluble on horizontal axes, the water flowing from the race into a reservoir, wherein it is stored and utilized during the ebb tide, a suitable gate being provided for such reservoir. The water-driven wheel is carried by a float that rises and falls with the flood and ebb, means being provided whereby the rising-and-falling movements of the float are made to control the like movements of the gates.

That my invention may be fully understood, and in order to enable others skilled in the art to which it pertains to make and use the same, I will describe the construction and operation of my improved apparatus by means of which my said invention is carried into practical effect, reference being had to the accompanying drawings, in which—

Figures 1 to 7 are diagrammatic views illustrative of the operations of the apparatus. Fig. 8 is a plan view, partly in section and partly broken away, of my improved tidal motor. Fig. 9 is a vertical longitudinal section, Fig. 10 an end view, and Fig. 11 a vertical cross-section taken on line 11 of Fig. 9 of said motor, and Fig. 12 is a detail top plan view of the power-transmitting gear.

In order that the operations may be performed as described, it will be understood that the flood and ebb tide gates are hollow bodies, hence buoyant; that suitable means are provided for filling them with water for the purpose of sinking them; that pumps are provided for removing such water and making them buoyant, and that means are provided in the side walls of the race for locking the gates against upward movement. This being understood, in order to start the motor the ebb-tide gate $U^2$ is filled with water and sunk into its lowermost position, while the water in the flood-tide gate $U'$ is nearly pumped out to render it buoyant, so that its lug $u'$ will bear with a slight pressure on the top of the wheel-float $S'$, Fig. 1. As the float $S'$ rises, the gate $U'$ is carried along, and when the latter has reached the position shown in Fig. 3 it is locked against further upward motion by any suitable means, whereupon the lug $u'$ is screwed upwardly, so that the float $S'$ can rise without acting on the gate. The uppermost position of the gate $U'$ and float $S'$ is shown in Fig. 4. Before the ebb commences the ebb-tide gate $U^2$ is pumped out to make it buoyant, so that it will rise and bring its lug $u^2$ in contact with the bottom of float $S'$ and exert a slight pressure thereon, while the flood-tide gate $U'$ is filled with water and sunk, the lug $u'$ of said gate being turned out of the way of the float, as hereinafter described, after said gate has been disengaged from the locking device above referred to, the position of the parts being shown in Fig. 5. As the float $S'$ sinks with the level of the water in the wheel-pit, the gate $U^2$ is carried along, and this continues until the water in the wheel-pit and that in the reservoir H are on the same level, whereupon the gate $U^2$ is sunk to its lowermost position by filling it with water, these operations being repeated at each flood and ebb.

I have deemed it unnecessary to show the pumps for pumping out or filling the gates, as any suitable style and construction of pump can be used. I have also stated that the rising of the gates can be limited by any suitable means, and this can be done in various ways. For instance, as shown in dotted lines on the left-hand side in Fig. 11, a groove or grooves $u^4$ of the required height may be formed in the side walls of the wheel-pit, the gates being provided with suitable lugs $u^3$, projecting into said grooves, so that when a gate has been raised to the required height the lug thereon will abut against the upper end of the groove, and thus prevent the further rising of such gate.

Of course it will be understood that the weight of the gates when filled with water will securely maintain them in their lowermost position.

Referring now to Figs. 1 to 7, K indicates a channel or race in which is formed a wheel-pit K′ of greater depth and width than said race, said pit containing a float S′, that carries the bearings for a water-wheel M, the race K leading from the sea at S into a reservoir H, a gate being provided on the sea and reservoir side of the wheel-pit, as indicated by the letters U′ and U², said gates being hereinafter referred to as the "flood-tide" and "ebb-tide" gates, respectively.

Supposing the flood tide has set in and the flood-tide gate U′ raised to provide a sufficient fall of water to drive the wheel M and the ebb-tide gate U² lowered, as shown in Fig. 1, the rising water will flow over gate U′ and revolve the wheel M, the tailings flowing into reservoir H. Simultaneously therewith the water in the wheel-pit K′ will also rise and gradually lift the float S′, and as the flood-tide gate U′ is provided with a lug or projection $u'$ in the path of said float said gate will also be lifted in proportion to the rise of the tide, Fig. 2, until the tide has reached its greatest height, Fig. 3, the water flowing over gate U′ continuing to rotate the wheel M until the water on the sea side of the race K and the water in the latter and in the reservoir H have attained the same level, Fig. 4. Before the tide commences to flow out the ebb-tide gate U² is raised and the flood-tide gate U′ is lowered, Fig. 5. As the tide flows out the water in reservoir H, flowing over the ebb-tide gate U², will turn the wheel M in an opposite direction, and as the tide recedes or flows out the level of the water in the race K is also gradually lowered, the float S′ sinking accordingly, and as the ebb-tide gate is also provided with a lug or projection $u^2$ in the path of the float said gate will be lowered by the float in proportion to the lowering of the water-level in the race K, this operation continuing until the difference between the water-level in the race and that in the reservoir H is insufficient to cause the wheel M to perform further useful work, when the ebb-tide gate U² is fully lowered, a uniform low level then existing in the reservoir, the race, and the sea, Fig. 7. Before the flood tide again sets in the flood-tide gate U′ is again sufficiently raised to bank up the incoming water, and thus obtain, upon a further rise of the tide, the necessary fall to rotate the wheel M, the described operations being repeated.

Having described the general operation of the apparatus, I will now describe the construction thereof, reference being had to Figs. 8 to 12, in which K indicates the race, and K′ the wheel-pit, which is of a substantially double T shape and intersects the race K, the parallel recesses K² being bounded by the inner lateral walls $a$ of the race and by the outer walls $b^2$. The float is U-shaped. The vertical members $S^2$, extending from the body S′, are of greater width than said body and are contained within the recesses K² of the wheel-pit, said vertical members $S^2$ carrying anti-friction-rollers $b$ on three sides, which rollers travel along and are guided by suitable rails $b'$, secured to the inner faces of the walls $b^2$, as shown in Fig. 8, whereby the said float is not only properly guided when rising or falling with the tide, but the oscillatory or rocking movements to which said float would otherwise be subjected under the action of the inflowing or outflowing water are reduced to a minimum, if not avoided altogether.

To the vertical members $S^2$ of the float S′ are secured suitable bearings $g$ for the shaft or journals $f$ of a water-wheel M. This wheel consists of a fluid-tight sheet-metal cylinder or drum $c$, whose heads $d$ are provided with bearings, preferably cone-bearings, Fig. 8, for the taper-journals $f$ for said wheel, said cylinder being provided with peripheral vanes or paddles $e$.

One of the heads $d$ of wheel M is provided on its outer face with circularly-arranged bevel-teeth, forming a toothed ring $d'$, that meshes with a bevel-pinion $h$ on a vertical shaft $h'$, Figs. 9 and 10. The shaft $h'$ is stepped in a step $h^2$, formed in one of the bearings $g$ for the wheel-journals $f$, Fig. 9, and is guided and steadied in a bearing $g'$ at the upper end of a standard $g^2$, secured to one of the vertical members $S^2$ of the float S′. That portion $h^3$ of shaft $h'$ above bearing $g'$ is squared and extends through a boss or bushing $l$, provided with a cross-head $l'$, that is secured to a platform $n$, Figs. 8 and 10. The bore of the bushing $l$ is of considerably greater diameter than the diameter of the squared portion $h^3$ of shaft $h'$, so as to admit of vibration or rocking of said shaft with the float S′ S², the upper end of the squared portion of such shaft passing through the correspondingly-shaped bore of a sleeve $i$, so that said shaft is free to move endwise in said sleeve, but is held against rotation therein. The sleeve $i$ has journals $i'$, extending into bearings formed on a gimbal $i^2$, whose journals $i^3$ have bearing in bearings $k'$ on a miter-wheel $k$, seated and revoluble on the bushing $l$, hereinbefore referred to.

By the means described, and shown in Figs. 8, 9, 10, and 12, a universal or gimbal joint is provided between the shaft $h'$ and the miter-wheel $k$, whereby said shaft $h'$ is free to oscillate or rock and also to move vertically with the float S′ S² without disturbing the said miter-wheel $k$, while the latter is caused to revolve with said shaft $h'$, its rotation being transmitted to a power-shaft $m'$ through a miter-gear $m$ thereon meshing with said miter-wheel $k$. The rotation of the power-shaft $m$, which revolves in bearings $n'$ on the platform $n$, may be transmitted to any element to be driven in any suitable or desired manner, as through a pulley $m^2$, Fig. 9, belted to the element to be driven.

The flood and ebb tide gates $U'$ $U^2$ are of substantially the same construction—namely, they are hollow bodies, preferably of sheet metal, having the walls exposed to the pressure of the water—i. e., the walls $o^\times$ facing the sea S and reservoir H, respectively, of convex form and suitably stayed or braced to the inner wall $o$ by diagonal braces $o'$, said outer wall $o^\times$ of each gate being provided with guide flanges or ribs $o^2$, guided between two vertical rails $a'$ $a'$, secured to the lateral walls $a$ of the race K. (See Fig. 8.) The dimensions and weight of the gates $U'$ $U^2$ are so chosen as to be held in their various positions by the buoyancy of the water—i. e., they are "floats," practically speaking; but, if desired, a suitable locking device, whereby said gates may be positively locked against up or down movements along their ways, may be provided.

Of course the float $S'$ $S^2$, the wheel M, and the transmitting-shaft $h'$, carried thereby, rise and fall with the tide, as explained, and, if necessary, counterpoises may be provided for these parts.

At a convenient distance above each of the gates $U'$ $U^2$ is arranged a gang-plank or platform $p$, supported from the top plates $o^3$ of the said gates by columns $p'$, suitably braced together by diagonal braces $p^2$, said gang-planks having preferably hand-rails or guards $p^4$ for obvious purposes, steps or ladders $p^3$ being provided for reaching the gang-planks from the gates.

It has heretofore been stated that the gates $U'$ $U^2$ are respectively lifted and lowered by the float $S'$ $S^2$ through the medium of lugs $u'$ $u^2$ on said gates. Under certain conditions it becomes necessary, however, to lift or lower either or both gates independently of the float, and to this end it is necessary that means be provided for moving the said lugs out of the way of the float and for manipulating the lugs. To this end there is a vertical recess $o^4$ provided in the inner face of each gate of proper height, these recesses forming guide-grooves for said lugs. At their upper ends said guide-grooves $o^4$ are enlarged laterally, the width of the enlarged portion being greater than the length of the lugs $u'$ $u^2$, as shown by dotted lines at $o^5$, Fig. 9, said lugs having a screw-threaded opening in which works the lower screw-threaded end of a rod $r$, adapted to be manipulated by a hand-wheel thereon from the gang-planks $p$, Figs. 9 and 11, said screw-threaded end of the rod $r$ working in a nut or block on the gate.

It is obvious that by revolving the rod in one or the other direction the lug $u'$ or $u^2$, as the case may be, being held against rotation by the walls of the recess or groove $o^4$, is free to move up and down therein, whereby said lug can be adjusted either upwardly or downwardly by the rotation of the screw-threaded rod $r$ when the latter is revolved in one or the other direction. On the other hand, if it is desired to move the lug out of the way of the float it is screwed up on the rod until it reaches the upper end of the groove or recess, when it will bear against an abutment on the screw-rod, and will therefore turn with said rod and can thus be moved into the lateral branch or enlargement $o^5$ at the upper end of the guide recess or groove $o^4$ in the gate out of the way of the float. By making the lugs $u'$ $u^2$ adjustable on their rods $r$ said lugs can also be positioned relatively to the float $S'$ $S^2$ so that the latter will contact therewith at the proper time to move the flood-tide gate upward and the ebb-tide gate downward after these gates have been positioned on the flood and ebb of the tide to provide the proper fall of water. Furthermore, by the described arrangement and adjustability of the lugs $u'$ $u^2$ the wheel M may operate as an overshot, middleshot, or undershot wheel, the water being delivered thereto at different heights according to the height of the tide. In the arrangement shown the water-wheel M is supposed to operate as a middleshot-wheel with a medium height of tide from three to four meters.

Inasmuch as the wheel M revolves in opposite directions during the flood and ebb of the tide, respectively, suitable reversing-gear will in practice be provided for the purpose of revolving the driven element continuously in the same direction, as will be readily understood.

By constructing the flood and ebb tide gates $U'$ $U^2$, as well as the water-wheel M, in the form of hollow bodies the weight of these parts is reduced to a minimum, thereby enabling the float to more readily rise and fall with the said parts under the influence of the rising and falling tide.

Having thus described my invention, what I claim as new therein, and desire to secure by Letters Patent, is—

1. In a tidal motor, the combination with a buoyant flood-tide or inlet gate and a like outlet-gate, of a float interposed between and adapted to move said gates, and a wheel carried by the float, for the purpose set forth.

2. In a tidal motor, the combination with a buoyant flood-tide or inlet gate and a like ebb-tide or outlet gate, of a float interposed between and adapted to move said gates, and a buoyant wheel carried by said float, for the purpose set forth.

3. In a tidal motor, the combination with a flood-tide or inlet gate, an ebb-tide or outlet gate, each provided with a lug projecting from the inner faces of said gates; of a float interposed between and adapted to impinge upon said lugs and move said gates, a wheel carried by the float, mechanism for lifting or lowering the gates independently of the float, and means for moving the aforesaid lugs out of the path of said float, for the purpose set forth.

4. In a tidal motor, the combination with a flood-tide or inlet gate, an ebb-tide or outlet gate, and an abutment projecting from the proximate faces of said gates, said abutment adjustable vertically along said faces; of a float interposed between and adapted to impinge on the aforesaid abutments and move the gates, a wheel carried by the float, means for lifting and lowering the gates independently of the float, and means for moving the abutments out of the way of said float, for the purpose set forth.

5. In a tidal motor, the combination with flood-tide or inlet and ebb-tide or outlet gates, a float interposed between such gates, a wheel carried by the float and provided with a toothed rim, and a vertical shaft carrying a pinion in gear with said toothed rim, said shaft rising and falling with the float; of a transmitting-gear and a universal joint between said gear and the aforesaid vertical shaft in which joint such shaft is free to move vertically but locked against rotation therein, for the purpose set forth.

6. In a tidal motor, the combination with the race K, the reservoir H and the wheel-pit K' K² intersecting said race, the flood-tide or inlet and the ebb-tide or outlet gates U' U² arranged at opposite ends of the wheel-pit, said gates constructed in the form of hollow buoyant bodies having outer convex faces, and suitable guides for guiding said gates in their rising and falling movements; of a float interposed between and adapted to move the gates, and a wheel carried by said float, for the purpose set forth.

7. In a tidal motor, the combination with the race K, the wheel-pit K' K², suitable vertical guide-rails $b'$ on three of the walls of the portion K² of said pit, and a flood-tide or inlet and an ebb-tide or outlet gate at opposite ends of such wheel-pit; of a U-shaped float interposed between and adapted to move said gates, the vertical members of said float carrying an antifriction-roller $b$ on three of their sides, said rollers $b$ riding on the aforesaid guide-rails $b'$, bearings on said vertical members of the float, and a wheel revoluble in said bearings, substantially as and for the purpose set forth.

8. In a tidal motor, the combination with a flood-tide or inlet gate U' provided with a lug $u'$, and the ebb-tide or outlet gate U² provided with a lug $u^2$; of a float interposed between said gates, and a wheel carried by the float, the latter adapted to impinge upon the under face of lug $u'$ and upon the upper face of lug $u^2$, whereby said gates are moved in opposite directions by the float in rising and falling, respectively, for the purpose set forth.

9. In a tidal motor, the combination with a flood-tide or inlet gate and an ebb-tide or outlet gate; of a float interposed between said gates, a wheel carried by the float, and means whereby the aforesaid gates are moved in opposite directions by the float when it rises and falls with the tide, for the purpose set forth.

In testimony that I claim the foregoing as my invention I have signed my name, in presence of two witnesses, this 20th day of September, 1895.

JOHANN FERDINAND ROBERT KNOBLOCH.

Witnesses:
ALEXANDER SPECHT,
MAX LEMCKE.